(No Model.)
J. W. TERMAN.
JOURNAL BEARING.
No. 471,405. Patented Mar. 22, 1892.
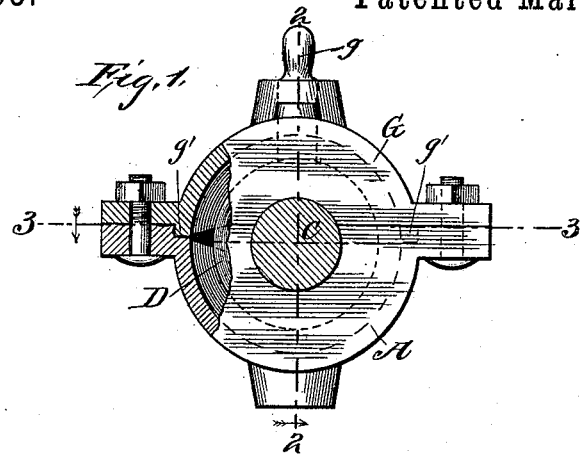
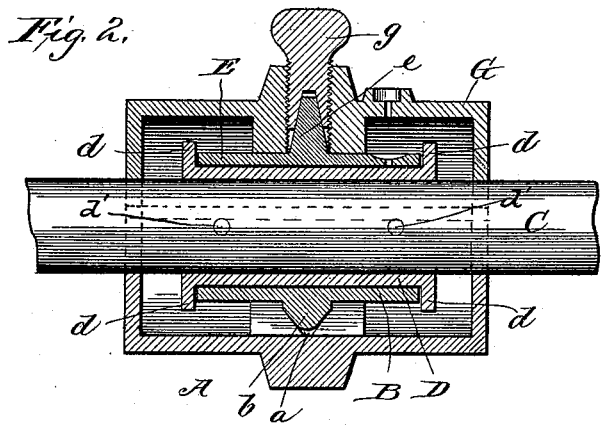
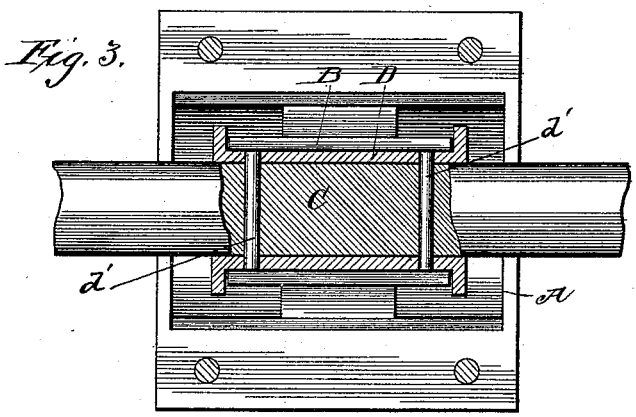

UNITED STATES PATENT OFFICE.

JAMES W. TERMAN, OF NEW SHARON, ASSIGNOR TO LEWIS W. BEARD, OF DECORAH, IOWA.

JOURNAL-BEARING.

SPECIFICATION forming part of Letters Patent No. 471,405, dated March 22, 1892.

Application filed September 23, 1891. Serial No. 406,579. (No model.)

*To all whom it may concern:*

Be it known that I, JAMES W. TERMAN, a citizen of the United States of America, residing at New Sharon, in the county of Mahaska, in the State of Iowa, have invented certain new and useful Improvements in Journal-Bearings, of which the following is a specification.

Referring to the accompanying drawings, wherein like reference-letters indicate like parts, Figure 1 is an end elevation of the journal-box; Fig. 2, a vertical section in line 2 2 of Fig. 1, and Fig. 3, a horizontal section in line 3 3 of Fig. 1.

It is well known that the various journal-bearings in a factory, machine, or truck are the cause of the greatest expense and anxiety, both because of the necessary refitting of the boxes and the bearing portions of the journal therein, and also of the necessity of constant and liberal lubrication of those parts.

The object of my invention is to reduce the expense of refitting those parts to the minimum and also to effect a liberal and continuous supply of the lubricant, with the occasional attention of the attendant. To accomplish this, I make all the parts upon which the friction of the bearings come so that they may be readily and easily replaced with new at a trifling expense, and at the same time the oil may be furnished automatically by a self-oiling box.

In the drawings, A indicates the lower part of the box. This is closed at the bottom and, up to the point where the shaft enters the same, forms a receptacle for oil or other lubricant.

B is the lower section of the bearing upon which the journal rests, and may have a face of babbitt, brass, chilled iron, or any other suitable material, and is provided with a teat $b$, fitting in a recess $a$ in the lower part of the box A.

C is the shaft or journal in position, upon which the tightly-fitting spool-shaped sleeve D, made in a single piece, or it may be made in two halves, is firmly fixed in any suitable manner, preferably by pins, screws, or bolts $d'$. At each end of said sleeve extend at right angles to the shaft the flanges $d\,d$. The sleeve may be of any suitable material; but I prefer to use chilled iron.

E is the upper section of the bearing, having a conical teat $e$, and G the cover to the box, closely fitted to the lower box A, so as to exclude dust, dirt, &c. To the cover G is fixed the set-screw $g$, having a conical cup corresponding reversely with the teat $e$. In the side of the box-cover G are dependent flanges $g'\,g'$, which, extending below the line of the connection of the parts A and G, will shed all oil into the lower box A without allowing it to escape through the aperture made by said connection.

The mode of operation is as follows: After the part A has been properly placed in position the bearing-plate B is placed therein. The projection $b$, fitting into the corresponding recess $a$ in the lower part of the box A, fixes the bearing B in proper position and yet allows a slight rocking movement, so that at all times it may accommodate itself to the shaft. The shaft C, with the sleeve D adjusted and firmly fixed to it, is then placed in position, the upper bearing E put on, and the cover G attached. The set-screw $g$, acting upon the projection $e$, may be adjusted from time to time to impart the necessary bearing upon the shaft. The lower box A being filled with oil, the flanges $d\,d$ constantly dip into the lubricant and carry it up, whereupon by force of gravity it runs down between said shoulders and the ends of the bearing E, and by means of the revolution of the shaft is carried under said bearing and circulated evenly between the faces thereof, thus at all times furnishing the parts with a constant and abundant supply of the lubricant.

The cover G, fitting closely, excludes all dust, and the oil is thus used over and over again, requiring only an occasional replenishing.

Having thus described my invention, what I claim as new, and desire to secure by Letters Patent, is—

The combination, of the box A, having the recess $a$, the closely-fitting cover G, having depending flanges $g'$, setting in corresponding depressions in box A, and the shaft C, provided with sleeve D, having flanges $d$, with the lower section of the bearings B, having a teat fitting in the recess $a$, the upper section E, having a teat $e$, and the cupped screw $g$, screwed into the cap G and receiving the teat $e$, all substantially as shown and described.

JAMES W. TERMAN.

Witnesses:
E. J. CURTIN,
M. E. FITCH.